(12) United States Patent
Wozniczka et al.

(10) Patent No.: US 6,596,427 B1
(45) Date of Patent: Jul. 22, 2003

(54) ENCAPSULATING SEALS FOR ELECTROCHEMICAL CELL STACKS AND METHODS OF SEALING ELECTROCHEMICAL CELL STACKS

(75) Inventors: Boguslaw Wozniczka, Coquitlam (CA); Jake DeVaal, Coquitlam (CA); Mehrzad Tabatabaian, Port Moody (CA)

(73) Assignee: Ballard Power Systems Inc., Burnaby (CA)

( * ) Notice: Subject to any disclaimer, the term of this patent is extended or adjusted under 35 U.S.C. 154(b) by 146 days.

(21) Appl. No.: 09/706,930

(22) Filed: Nov. 6, 2000

(51) Int. Cl.⁷ .......................... H01M 8/02; H01M 8/10; H01M 2/08
(52) U.S. Cl. ..................... 429/32; 429/26; 429/35; 429/36; 429/37; 29/623.2; 427/115
(58) Field of Search .............. 429/35, 36, 37, 429/26, 30, 32; 29/623.2, 623.5; 427/115

(56) References Cited

U.S. PATENT DOCUMENTS

| | | | | |
|---|---|---|---|---|
| 3,846,176 A | * | 11/1974 | Kuhl | 429/36 |
| 4,774,154 A | | 9/1988 | Singelyn et al. | 429/36 |
| 5,176,966 A | | 1/1993 | Epp et al. | 429/26 |
| 5,284,718 A | | 2/1994 | Chow et al. | 429/26 |
| 5,370,150 A | * | 12/1994 | Nehm | 137/454.2 |
| 6,013,723 A | * | 1/2000 | Akao | 524/353 |
| 6,080,503 A | * | 6/2000 | Schmid et al. | 429/30 |
| 6,086,643 A | | 7/2000 | Clark et al. | 29/623.2 |
| 6,322,920 B1 | | 11/2001 | Tomson | 429/34 |
| 6,372,373 B1 | | 4/2002 | Gyoten et al. | 429/35 |

FOREIGN PATENT DOCUMENTS

| | | | |
|---|---|---|---|
| WO | WO 00/24066 | | 4/2000 |
| WO | WO 00/35038 | * | 6/2000 |
| WO | WO 01/29921 | | 4/2001 |

* cited by examiner

*Primary Examiner*—Randy Gulakowski
*Assistant Examiner*—Jonathan Crepeau
(74) *Attorney, Agent, or Firm*—McAndrews, Held & Malloy, Ltd.

(57) ABSTRACT

An encapsulating seal for an electrochemical cell stack provides sealing when individual cell seals fail and also provides increased insulation and protection for the stack and its components. The encapsulating seal is disposed on at least one side of the cell stack and at least between one or more pairs of separator plates having a membrane electrode assembly between them. An improved method for sealing a electrochemical cell stack comprises forming an encapsulating seal with different material and conditions, such as with a seal material having a curing temperature greater than the operating temperature of the cell stack. The encapsulating seal can be formed by injection molding, potting or other suitable methods.

27 Claims, 3 Drawing Sheets

ENCAPSULATING SEALS FOR ELECTROCHEMICAL CELL STACKS AND METHODS OF SEALING ELECTROCHEMICAL CELL STACKS

FIELD OF THE INVENTION

The present invention relates to electrochemical cell stacks comprising encapsulating seals in addition to individual cell seals. The present invention also relates to improved methods of manufacturing and sealing electrochemical cell stacks through the use of individual cell seals and an encapsulating seal. The encapsulating seal is preferably be formed by injection molding or other suitable methods.

BACKGROUND OF THE INVENTION

Electrochemical cells comprising polymer electrolyte membranes (PEMs) may be operated as fuel cells. In such fuel cells, a fuel and an oxidant are electrochemically converted at the cell electrodes to form a reaction product, and producing electrical power in the process. Electrochemical cells comprising PEMs may also be operated as electrolyzers, in which an external electrical current is passed between the cell electrodes, typically through water, resulting in generation of hydrogen and oxygen at the respective electrodes of the cell.

FIG. 1 illustrates a typical design of a conventional, prior art electrochemical cell comprising a proton exchange membrane, and a stack of such cells. Each cell comprises a membrane electrode assembly (MEA) 5 such as that illustrated in an exploded view in FIG. 1a. Each MEA 5 comprises an ion-conducting proton exchange membrane 2 interposed between two electrode layers 1, 3 which are typically porous and electrically conductive. Each electrode comprises an electrocatalyst at the interface with the adjacent PEM 2 for promoting the desired electrochemical reaction. The electrocatalyst generally defines the electrochemically active area of the cell. The membrane electrode assembly may be consolidated as a bonded laminated assembly.

In an individual cell 10, illustrated in an exploded view in FIG. 1b, a membrane electrode assembly is interposed between a pair of separator plates 11, 12, which are typically fluid impermeable and electrically conductive. Fluid flow spaces, such as passages or chambers, are provided between each plate and the adjacent electrode to facilitate access of reactants to the electrodes and removal of products. Such spaces may, for example, be provided by means of spacers between separator plates 11, 12 and corresponding electrodes 1, 3, or by provision of a mesh or porous fluid flow layer between separator plates 11, 12 and corresponding electrodes 1, 3. More commonly channels (not shown) are formed in the face of the separator plate facing the electrode. Separator plates comprising such channels are commonly referred to as fluid (or reactant) flow field plates.

Electrochemical cells with an ion-conductive PEM layer, hereinafter referred to as PEM cells, are advantageously arranged to form a stack 100 (see FIG. 1d) comprising a plurality of cells disposed between a pair of end plates 17, 18. A compression mechanism (not shown) is typically employed to hold the cells tightly together, to maintain good electrical contact between components, and to compress the seals. In the embodiment illustrated in FIG. 1c, each cell 10 comprises a pair of separator plates 11, 12 with MEA 5 disposed between them. Cooling spaces or layers may be provided between some or all of the adjacent pairs of separator plates in the stack assembly. An alternative configuration has a single separator plate or "bipolar plate" interposed between pairs of membrane electrode assemblies. Such a bipolar separator plate contacts the cathode of one cell and the anode of the adjacent cell, thus resulting in only one separator plate per membrane electrode assembly in the stack (except for the end cell). In some arrangements, the stack comprises a cooling layer interposed between every few cells of the stack, rather than between each adjacent pair of cells.

The cell elements described have openings 30 formed therein which, in the stacked assembly, align to form fluid manifolds for supply and exhaust of reactants and products and, if cooling spaces are provided, for a cooling medium. Seals are typically provided between the faces of the membrane electrode assembly 5 and between each separator plate 11, 12 around the perimeter of the fluid manifold openings to prevent leakage and intermixing of fluid streams in the operating stack.

Sealing and construction of seals for electrochemical cell stacks is an important practical consideration. In some conventional cell stacks, resilient gaskets or seals are provided between the faces of the membrane electrode assembly 5 and each separator plate 11, 12 around the perimeter or at the edge to prevent leakage of fluid reactant and product streams. Such resilient gaskets are typically formed from elastomeric materials, and are typically disposed within grooves in the separator plates or membrane electrode assemblies, as described in, for example, U.S. Pat. Nos. 5,176,966 and 5,284,718. Over the course of the service life of an electrochemical cell, the elastomeric gaskets are subjected to prolonged deformation and sometimes a harsh operating environment. Over time, the resiliency of such gaskets tends to decrease due to, for example, compression set and chemical degradation, and the gaskets may become permanently deformed. This deformation impacts negatively on the sealing function and can ultimately lead to an increased incidence of leaks. Prevention of leakage and intermixing of reactants and/or coolant is an important consideration for cell stack design and manufacture. The present sealing technique overcomes problems caused by leakage of reactant and/or coolant streams from around and between gaskets, thereby improving cell stack performance.

In PEM electrochemical cells, the proton exchange membrane may project beyond the edges of the electrodes and cell separator plates around the perimeter and around manifold openings. The projecting portion of the proton exchange membrane may serve to avoid short circuits between plates, and it typically contacts and cooperates with the gaskets to form the fluid seal between the membrane electrode assembly and separator plates. Such designs tend to leave the edge of the proton exchange membrane exposed to air and/or reactant or coolant streams, however. Exposure to air or other dry gas streams can cause drying of the proton exchange membrane beginning from the edge and moving towards the center. Drying of the membrane can lead to permanent damage to the membrane, reduced cell performance and ultimately malfunction of the PEM cells. Exposure of the edge of the proton exchange membrane to some coolants and other streams can result in physical and/or chemical damage to the membrane or electrodes.

Another approach to sealing the membrane electrode assembly involves the use of an adhesive bond between each separator plate and the MEA in those regions of the cell where sealing is necessary or desirable. The adhesive bond must be substantially gas and liquid impermeable. Adhesive materials (otherwise commonly referred to as adhesives, bonding agents, glues or cements) are typically employed to form a seal and bond, for example, around the perimeter of the electrochemically active area of the MEA and around fluid manifold openings formed in the cell elements, while consolidating individual components of the PEM cell into a unitary structural unit. The MEA is preferably firmly bonded or adhered to the separator plates such that force would be required to separate the components.

In the design and manufacture of PEM cells, it is desirable to make the individual cell elements thinner. Due to the increasing demands on seals as cell elements become progressively thinner, providing for reliable sealing of fuel cell stacks will be an important part of increasing service life and decreasing maintenance costs. As cell thickness decreases, the seals between the membrane electrode assembly and separator plates have become thinner. As cells have become thinner, the cells have become more difficult to make reliably leak-proof. Further, they have become more vulnerable to electrical shorts and high temperatures within the cells. Additionally, the seals can be subjected to a harsh operating environment, which can decrease their useful service lives still further.

PCT/International Publication No. WO 00/24066 discloses a fuel cell stack in which the separator plates and membrane electrode assemblies are held together with a fluoroelastomeric adhesive/sealant. The adhesive/sealant is provided both on the outer edges of the cell components and between the membrane electrode assembly and a water transport plate. The fluoroelastomeric material is stated to replace a variety of interfacial seals and edge seals formerly required.

U.S. Pat. No. 4,774,154 discloses seal materials for fuel cells comprising a high temperature stable fluorinated elastomer and a blowing agent which activates within the range of curing temperatures of the elastomer. The elastomer is employed to seal the edges of adjacent separator plates in a fuel cell. The patent discloses that suitable elastomers are those having a range of curing temperatures which are less than to about the normal operating temperature of the fuel cell.

PEM fuel cells generate electrical power in stationary power plants, in portable power generation systems, and in the propulsion systems for motor vehicles. For these applications, a PEM fuel cell service life of at least approximately 10 years is desirable. Production cost and reliability of fuel cell seals, and simplicity and cost-effectiveness of maintenance and repair, are also important considerations.

SUMMARY OF THE INVENTION

In one embodiment, an electrochemical cell stack has a top, a bottom, and at least one side (more commonly, four sides). The stack comprises at least one membrane electrode assembly, a plurality (that is, two or more) of separator plates, at least one encapsulating seal disposed on at least one side of the cell stack, and at least one individual cell seal disposed between the membrane electrode assembly and the encapsulating seal. Each of the membrane electrode assemblies comprises an anode, a cathode and an ion exchange membrane, and each membrane electrode assembly is capable of electrochemically converting a fuel and an oxidant to produce electrical power, or (in the context of an electrolyzer) is capable of generating of hydrogen and oxygen at the electrodes. Each of the membrane electrode assemblies is disposed between two separator plates.

Each cell seal is preferably in contact with a membrane electrode assembly at or near the periphery of the membrane electrode assembly in a cell sealing area. The cell sealing area of the membrane electrode assembly divides the electrochemically active area of the membrane electrode assembly and the environment outside the membrane electrode assembly. In a preferred embodiment, the individual cell seal is disposed in a cell sealing area of the membrane electrode assembly and made of a material such that the individual cell seal will prevent leakage of reactants from the membrane electrode assembly. Alternatively, the individual cell seal need not be fluid impermeable (or gas-tight), but instead serves to prevent the encapsulating seal from contacting the membrane electrode assembly.

Each encapsulating seal is preferably in contact with the electrochemical cell stack, disposed on at least one side of the cell stack and at least between one or more pairs of separator plates that have a membrane electrode assembly between them.

In a preferred embodiment, the electrochemical cell stack is a fuel cell stack, and the ion exchange membranes are polymer electrolyte membranes.

In a preferred embodiment, one or more of the separator plates has at least one groove formed in a major surface thereof, and the encapsulating seal includes at least one rib configured to be accommodated within the groove. Alternatively or additionally, the electrochemical cell stack preferably comprises one or more coolant plates. Each coolant plate preferably comprises at least one grove, and the encapsulating seal preferably includes at least one rib configured to be accommodated within the groove.

The encapsulating seal is preferably formed from an injection moldable material. In a preferred embodiment, the injection moldable material has a curing temperature greater than the operating temperature of the electrochemical cell stack.

In an alternative embodiment, the seal is "potted," or cast in place. Potting is preferably accomplished with a thermosetting or chemical-setting seal material. One preferred form of potting is dip-molding, in which the encapsulating seal is applied by dipping the stack into the seal material or pouring a viscous thermoplastic or thermoset seal material over the outside of the stack.

In a preferred embodiment, the encapsulating seal also at least partially encases one or both end plates. One or both of the end plates preferably has at least one end plate groove formed in a major surface thereof, and the encapsulating seal preferably includes at least one end sealing portion configured to be accommodated within the end plate groove.

In a preferred embodiment, the encapsulating seal is a monolithic seal that encases each side of the electrochemical cell stack and may also additionally encase the top and bottom of the stack. The encapsulating seal preferably imparts compressive force to the electrochemical cell stack and optionally one or more of the end plate sealing portions.

In another embodiment, a compression assembly for an electrochemical cell stack consists essentially of an encapsulating seal.

An improved method is also provided for manufacturing an electrochemical cell stack. The stack has a top, a bottom, and at least one side, and, in preferred embodiments, has four or more sides. The stack comprises at least one membrane electrode assembly interposed between a plurality of separator plates. The method comprises providing an individual cell seal around each membrane electrode assembly, arranging the membrane electrode assemblies and separator plates in an operative configuration in a stack, and forming an encapsulating seal on at least one side of the stack. The encapsulating seal is disposed at least between one or more of the plurality of separator plates having one of the membrane electrode assemblies disposed between them.

In a preferred embodiment, the step of forming an encapsulating seal comprises one of injection molding and potting, which in a preferred embodiment is performed while the stack is under compression.

In a preferred embodiment, an encapsulating seal is formed while flowing a coolant through the cell stack. In this embodiment, the encapsulating seal is preferably formed at a temperature greater than the operating temperature of the electrochemical cell stack. In a preferred embodiment, the seal material has a curing temperature greater than the operating temperature of the electrochemical cell stack. The preferred method further comprises the step of preventing the encapsulating seal from contacting the membrane electrode assemblies while the encapsulating seal is being formed.

DETAILED DESCRIPTION OF PREFERRED EMBODIMENT(S)

The present improved encapsulating seal reduces or eliminates leakage, and provides electrical or thermal isolation and added protection against damage to the ion exchange membrane such as from drying. The present seal encapsulates at least one side, preferably all sides, of the electrochemical cell stack in conjunction with cell seals on individual cells, thereby providing effective sealing even in the event of a failure of a cell seal. The encapsulating seal provides other advantages, such as applying a compressive force to the cell stack. As used herein, the term "encapsulating" means encasing one or more exterior surfaces in whole or in part.

Figure 1A:
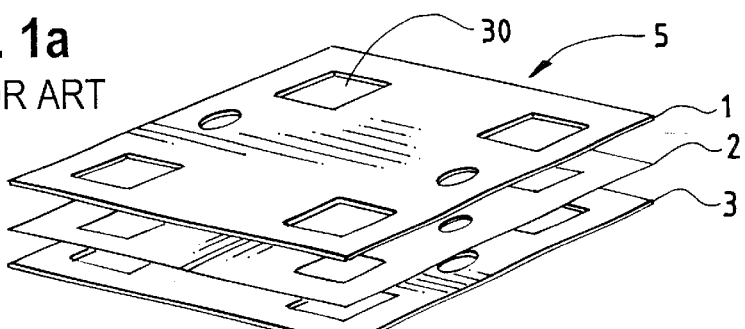
FIGS. 1a–1c are exploded perspective views and FIG. 1d is an isometric view of a conventional, prior art electrochemical PEM fuel cell stack.
Figure 1B:
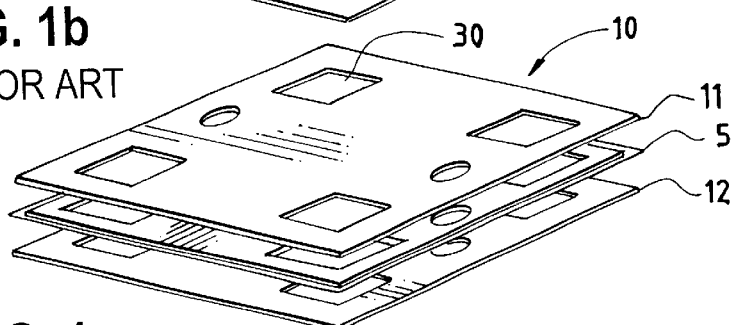
Figure 1C:
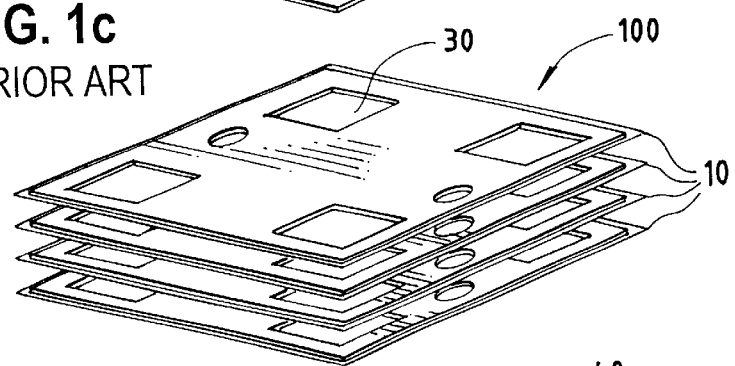
Figure 1D:
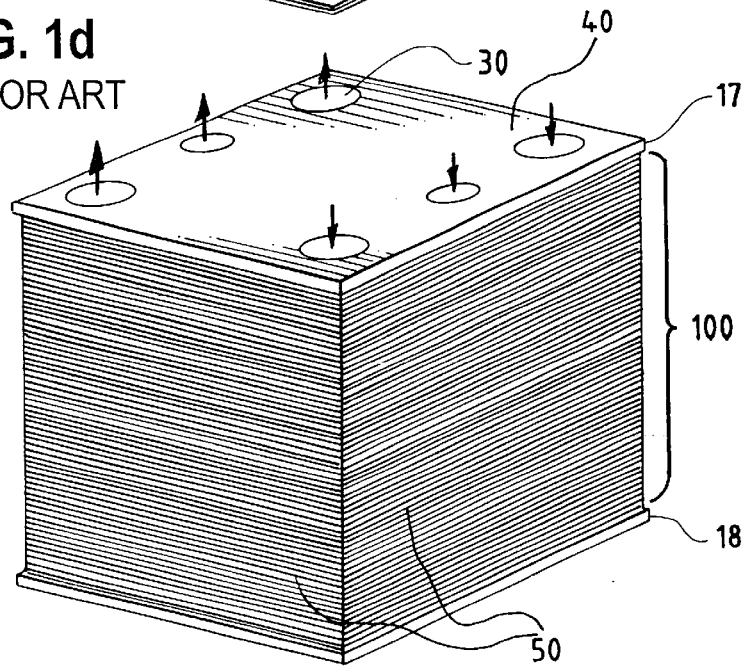
Figure 3:
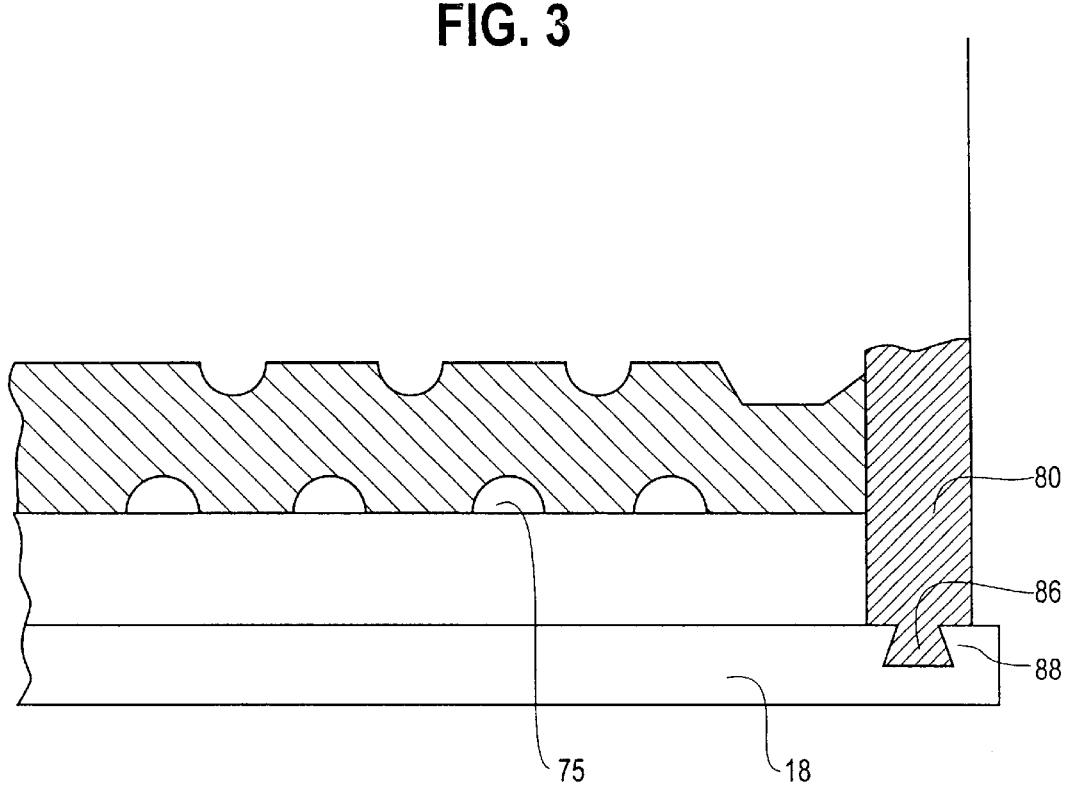
FIG. 3 is a sectional view of a portion of a fuel cell stack comprising an end plate and an encapsulating seal.

FIG. 1d shows an isometric view of an electrochemical cell stack 100 before installation of an encapsulating seal 80. The electrochemical cell stack in this embodiment has a top 40, a bottom (not visible), and four sides, only two of which 50 are shown. In the embodiment shown in FIG. 1d, the electrochemical cell stack comprises fuel cells, although electrolyzer cells may be employed instead. The electrochemical cell stack 100 comprises a plurality of membrane electrode assemblies (MEAs) 5, and a plurality of separator plates 11, 12 and end plates 17, 18 at the top and bottom of the stack. The individual MEAs are interposed between the separator plates. In the embodiment illustrated in FIG. 1b, two different separator plates are in each cell 10. Other embodiments comprise a single bipolar plate interposed between pairs of MEAs. In the embodiment of FIG. 3, separator plate 11 includes coolant spaces or channels 75, which allow for flowing coolant into the stack to prevent overheating of the cells during operation.

Figure 2:
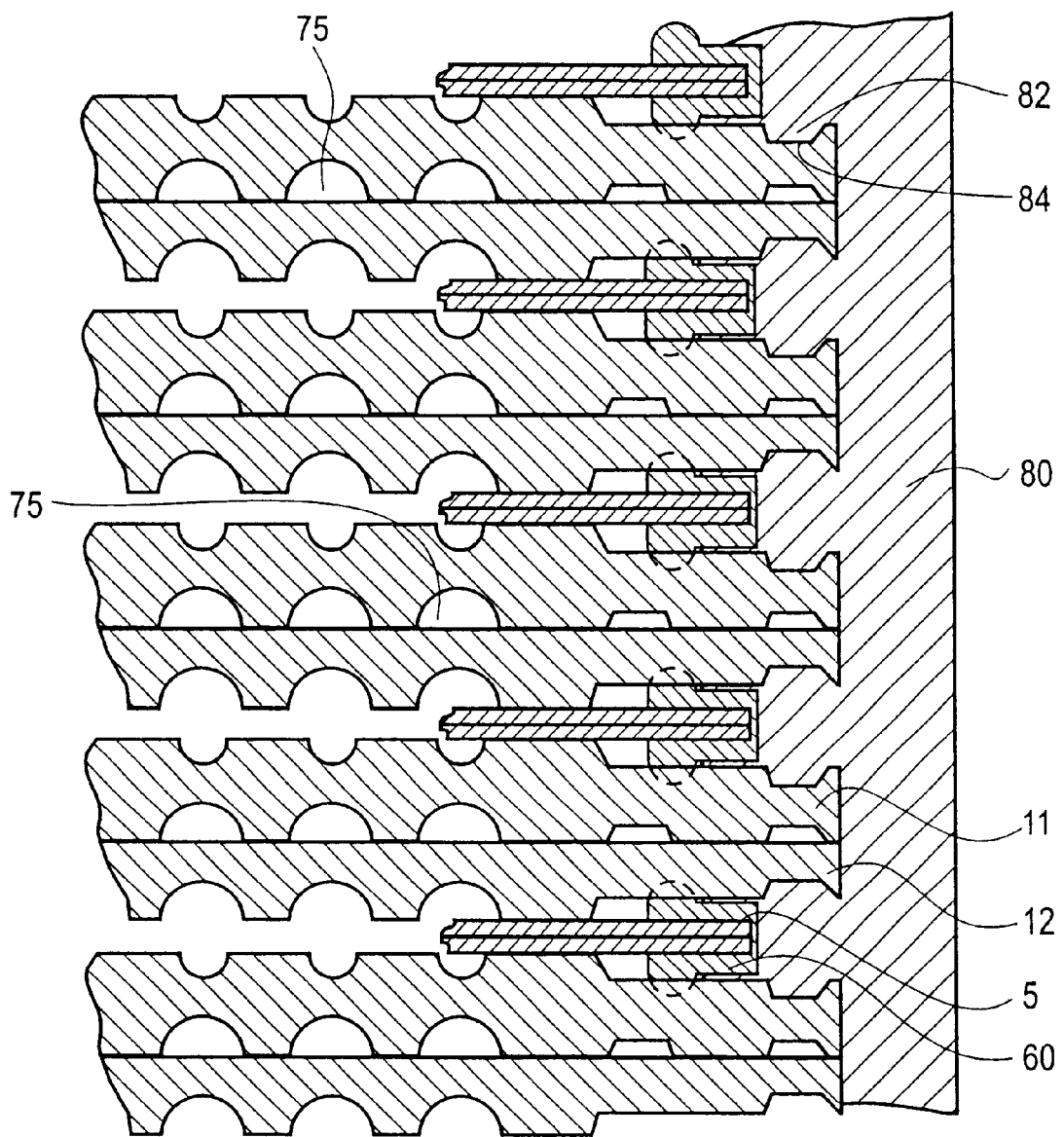
FIG. 2 is a sectional view of a portion of a fuel cell stack comprising a plurality of cell seals and an encapsulating seal.

Referring now to FIG. 2, the periphery of the MEAs 5 includes a cell sealing area in which the MEAs 5 are in contact with individual cell seals 60. Preferably, the cell sealing area is free of electrocatalyst and not within the electrochemically active area of the cell, and the individual cell seals are disposed in the cell sealing area and prevent leakage from the membrane electrode assemblies. Any suitable cell seal can be employed. For example, the cell seal 60 can be a resilient gasket. The MEAs 5 are disposed between separator plates 11, 12.

In an alternate embodiment, the individual cell seals need not contact the MEAs or be fluid impermeable (or gas-tight) to prevent leakage. The individual cell seals in this alternate embodiment serve to prevent the ingress of the encapsulating seal while it is being formed into contact with the MEAs. Such a cell seal comprises an embossed ridge on the separator plates.

An encapsulating seal 80 is formed and disposed on at least one stack side, preferably all stack sides, and between those separator plates 11, 12 having a membrane electrode assembly 5 between them. Although not shown in FIG. 2, the encapsulating seal 80 can also be formed and disposed between separator plates that have cooling spaces 75 between them. In preferred embodiments, the encapsulating seal covers at least one entire side of the stack. Alternatively, the encapsulating seal can be monolithic, in that the seal continuously covers and seals the entire outside surface of the stack on all sides. In some of the present fuel cell stack embodiments, a single unit includes four quarter stacks, and each individual quarter stack is an operative fuel cell stack. In such embodiments, the encapsulating seal can be formed and disposed on an individual quarter stack or on the entire unit.

If one or more individual cell seals fail, the encapsulating seal 80 maintains the integrity of the barrier protecting the cells and prevents leaks of reactant or coolant fluids. The encapsulating seal also provides electrical and/or thermal insulation of the stack. Additionally, the encapsulating seal also protects the membrane electrode assemblies, the separator plates, and the cell seals from a harsh external operating environment. Alternatively, the encapsulating seal may insulate the outside environment from the cell stack. Thus, the encapsulating seal not only provides a backup sealing function but can also serve to prolong the effectiveness of the seals.

In some embodiments, the encapsulating seal is formed by injection molding.

Once the encapsulating seal is in place, individual cell seals can fail without causing external leaks. Further, an individual cell may experience an electrical short without causing an external stack leak or damaging other cells. The use of an encapsulating seal may eliminate the need for time-consuming and expensive maintenance necessitated by the failure of individual cells.

Under some circumstances, leakage from a cell seal may inflate and possibly displace the encapsulating seal. In this regard, such inflation and displacement may result in the individual cell seal not being in contact with the MEA, yet the cell seal may still prevent leakage and/or prevent contact by the encapsulating seal with the MEA. In any event, resistance to inflation and displacement may be enhanced by providing the separator plates with grooves 84, which are formed on a major surface of the separator plate, as shown in FIG. 2. As further shown in FIG. 2, the encapsulating seal is provided with complementary ribs 82. The ribs 82 are accommodated within the grooves 84, thereby providing added stability and connection. It is particularly preferable to employ an injection molding procedure to make an encapsulating seal having ribs 82 that are accommodated within grooves 84. An injection-molded encapsulating seal would flow into the open areas of the stack, including the grooves, while still molten. Upon solidification, the ribs formed in the molding would interlock with the grooves, thus securing the encapsulating seal in place and resisting any internal pressure caused by cell seal leakage.

The ribs 82 and grooves 84 may be configured to facilitate removal of the encapsulating seal from the cell stack. For example, the grooves may be sloped such that the ribs will slide out rather than break off and leave material in the grooves. This can facilitate removal of the encapsulating seal for maintenance of the cell and reapplication of a new encapsulating seal after any necessary cell repairs had been performed.

In a further embodiment, the encapsulating seal may provide a seal for at least one end plate. For example, the encapsulating seal may encase one or both end plates, in whole or in part. As another example, shown in FIG. 3, the encapsulating seal may comprise an end sealing portion 86, and at least one end plate may include an end plate groove 88. The end sealing portion 86 is configured to interlock with the end plate groove 88 in the end plate 18. The connection of the end sealing portion 86 and the end plate groove 88 seals against leakage at the end plate. The end sealing portion 86, in one embodiment, is a straight extension of the encapsulating seal that interlocks with a rectangular end plate groove. In the embodiment illustrated in FIG. 3, the end plate groove 88 is undercut to provide an interlock with the end sealing portion 86, which may serve to both improve the sealing capabilities and hold the stack together. Alternatively, an end plate groove could be located on an outside edge (not shown in FIG. 3) of the end plate. An end plate may comprise more than one end plate groove.

In some embodiments, if an appropriate material is employed for the encapsulating seal, an encapsulating seal may be used in addition to or in place of current compression mechanisms for the cell stacks. A monolithic encapsulating seal may be preferred in such embodiments. An appropriate seal material will form a seal having sufficient strength and resiliency to provide compressive force to the cell stack.

A fuel cell assembly may be assembled by first fitting the MEAs with cell seals. The MEAs and separator plates may then be arranged in a stack, with the MEAs interposed between separator plates. The encapsulating seal is then inserted, preferably by injection molding, around the side of the stack.

Fuel cell stacks are often assembled under compression imparted by an external load. In one embodiment, the cell stack is under compression when the encapsulating seal is formed. As mentioned above, a seal material is typically selected to enable the encapsulating seal to maintain compression on the stack after the external load is released.

The separator plates also preferably include at least one coolant channel 75, or alternatively, a separate coolant transport plate can be included in the electrochemical cell stack. Typically, coolant flows through the cell stack via the coolant channel 75 during operation to help prevent the cells from overheating.

In a preferred method for manufacturing an electrochemical cell assembly, coolant flows through the electrochemical cell stack while the encapsulating seal is formed, such as when encapsulating seal is formed by injection molding. This allows for injection molding at an elevated temperature, including at a temperature above the operating temperature of the cell stack, thereby allowing use of an encapsulating seal material having a curing temperature that is higher than the operating temperature of the cell stack.

Such a seal will form at higher temperatures without damaging the cells during the injection molding process. For instance, the encapsulating seal can be formed at the fault temperature of the cells. By actively flowing coolant through the cells during the injection molding process, an encapsulating seal can be molded in place without damage to the cells. If such molding were performed without flowing the coolant, the cells could be damaged by an encapsulating seal material that imparted excessive amounts of heat to the cell components.

By employing a material that is formed at elevated temperatures, the encapsulating seal can be made so that it will better maintain its integrity at higher temperatures. By employing such a material, the encapsulating seal will perform better at temperatures at or exceeding the operating temperature of the cell, preferably up to the temperature experienced at cell fault conditions.

The encapsulating seal is formed from any suitable sealant material, preferably a flow processable elastomer, such as, for example, a thermosetting liquid injection moldable compound (for example, silicones, fluoroelastomers, fluorosilicones, ethylene propylene di-methyl, and natural rubber). By cooling the stack during the molding process, higher temperature thermoplastics can also be employed.

In some embodiments, the use of an encapsulating seal may change the requirements or demands of the cell seal. For example, the encapsulating seal can be designed to assume the greater role of leak protection during operation of the cell stack, and the cell seal may only be intended to prevent the material comprising the encapsulating seal from contacting the membrane electrode assemblies or separator plates, at least before the encapsulating seal material solidifies. In other words, in certain embodiments, the individual cell seal need not function as a seal at all during fuel cell operation but rather only needs to seal the MEA from the encapsulating seal material, such as during formation of the encapsulating seal. Materials that have previously been considered unacceptable for use as fuel cell seals can be employed as an encapsulating seal in the present technique.

One such alternative is to cast an epoxy based cell seal disposed on or about the MEA to prevent flashing of the seal material for the encapsulating seal through electrode layers of the MEA, and then to employ a high-temperature thermoplastic as the seal material for the encapsulating seal. A potential advantage of this alternative is preventing edge-shorts in MEAs.

An additional alternative would be to employ a cell seal comprising an embossed ridge on a separator plate rather than a separate seal material.

While particular elements, embodiments and applications of the present invention have been shown and described, it will be understood, of course, that the invention is not limited thereto since modifications may be made by those skilled in the art, particularly in light of the foregoing teachings. It is therefore contemplated that the appended claims cover such modifications that incorporate those features coming within the scope of the invention.

What is claimed is:

1. An electrochemical cell stack having a top, a bottom, and at least one side, said stack comprising:
   (a) at least one membrane electrode assembly, each of said membrane electrode assemblies comprising an anode, a cathode and an ion exchange membrane;
   (b) a plurality of separator plates, each of said membrane electrode assemblies being disposed between two of said separator plates;

(c) at least one encapsulating seal disposed on at least one side of said cell stack and at least between one or more of said plurality of separator plates having one of said membrane electrode assemblies between them; and (d) at least one individual cell seal, each said individual cell seal being disposed between said at least one membrane electrode assembly and said at least one encapsulating seal.

2. The electrochemical cell stack of claim 1, wherein said electrochemical cell stack is a fuel cell stack.

3. The electrochemical cell stack of claim 2, wherein at least one of said ion exchange membranes is a polymer electrolyte membrane.

4. The electrochemical cell stack of claim 1, wherein said encapsulating seal is secured to said separator plates.

5. The electrochemical cell stack of claim 1, wherein said encapsulating seal is in contact with each of said individual cell seals.

6. The electrochemical cell stack of claim 1, wherein at least one of said separator plates has at least one groove formed in a major surface thereof, and said encapsulating seal includes at least one rib configured to be accommodated within said at least one groove.

7. The electrochemical cell stack of claim 1, further comprising a plurality of coolant plates comprising conduits for directing a coolant stream therethrough.

8. The electrochemical cell stack of claim 7, wherein said encapsulating seal is secured to said coolant plates.

9. The electrochemical cell stack of claim 7, wherein at least one of said coolant plates has at least one groove formed in a major surface thereof, and said encapsulating seal includes at least one rib configured to be accommodated within said at least one groove.

10. The electrochemical cell stack of claim 1, wherein said encapsulating seal is formed from an injection moldable material.

11. The electrochemical cell stack of claim 10, wherein said injection moldable material has a curing temperature greater than the operating temperature of said electrochemical cell stack.

12. The electrochemical cell stack of claim 1, wherein said encapsulating seal is formed at a temperature greater than the operating temperature of said electrochemical cell stack.

13. The electrochemical cell stack of claim 1, wherein said encapsulating seal is formed from a thermoplastic material.

14. The electrochemical cell stack of claim 13, wherein said individual cell seal comprises an epoxy-based material that prevents flashing of said thermoplastic material while said encapsulating seal is formed.

15. The electrochemical cell stack of claim 1, wherein said electrochemical fuel cell stack includes at least one end plate, and said encapsulating seal contacts said at least one end plate.

16. The electrochemical fuel cell stack of claim 1, wherein said electrochemical fuel cell stack includes at least one end plate, and wherein said encapsulating seal at least partially encases said end plate.

17. The electrochemical fuel cell stack of claim 16, wherein said at least one end plate has at least one end plate groove formed in a major surface thereof, and said encapsulating seal includes at least one end sealing portion configured to be accommodated within said at least one groove.

18. The electrochemical cell stack of claim 1, wherein said encapsulating seal is a monolithic seal that encases each side of said electrochemical cell stack.

19. The electrochemical cell stack of claim 1, wherein said encapsulating seal imparts compressive force to said electrochemical cell stack.

20. A method for manufacturing an electrochemical cell assembly having a top, a bottom, and at least one side, said stack comprising at least one membrane electrode assembly interposed between a plurality of separator plates, said method comprising:

(a) providing an individual cell seal between each one of said at least one membrane electrode assembly and the environment outside the cell stack;

(b) arranging said at least one membrane electrode assembly and said plurality of separator plates in an operative configuration in a stack; and (c) forming an encapsulating seal on at least one side of said stack, wherein said encapsulating seal is disposed at least between each of said plurality of separator plates having one of said membrane electrode assemblies disposed therebetween.

21. The method of claim 20 wherein each individual cell seal is disposed in a cell sealing area of said at least one membrane electrode assembly and wherein each individual cell seal is formed from a sealant material that prevents leakage of reactants from within said at least one membrane electrode assembly.

22. The method of claim 20 wherein said step of forming an encapsulating seal comprises one of injection molding and potting.

23. The method of claim 22 wherein said forming step is injection molding, said injection molding being performed while said stack is under compression.

24. The method of claim 20, further comprising the step of flowing a coolant through said cell stack while said encapsulating seal is being formed.

25. The method of claim 23 wherein said encapsulating seal is formed at a temperature greater than the operating temperature of said electrochemical cell stack.

26. A method for manufacturing an electrochemical cell stack, said method comprising:

(a) arranging at least one membrane electrode assembly in a stack, said membrane electrode assemblies being interposed between separator plates, said stack including at least one side;

(b) flowing a coolant into said electrochemical cell stack; and (c) forming an encapsulating seal on at least one side of said stack while flowing said coolant within said electrochemical cell stack.

27. The method of claim 26, further comprising the step of preventing said encapsulating seal from contacting said at least one membrane electrode assembly while forming said encapsulating seal.

* * * * *